United States Patent
Sjöberg et al.

(10) Patent No.: US 12,363,305 B2
(45) Date of Patent: Jul. 15, 2025

(54) DERIVATION OF A VALUE FOR EACH LAYER REPRESENTATION OF A BITSTREAM

(71) Applicant: Telefonaktiebolaget LM Ericsson (publ), Stockholm (SE)

(72) Inventors: Rickard Sjöberg, Stockholm (SE); Martin Pettersson, Vallentuna (SE); Mitra Damghanian, Upplands-Bro (SE); Jacob Ström, Stockholm (SE); Zhi Zhang, Solna (SE); Jack Enhorn, Kista (SE); Ruoyang Yu, Täby (SE); Du Liu, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/008,814

(22) PCT Filed: Jan. 27, 2021

(86) PCT No.: PCT/SE2021/050048
§ 371 (c)(1),
(2) Date: Dec. 7, 2022

(87) PCT Pub. No.: WO2021/251859
PCT Pub. Date: Dec. 16, 2021

(65) Prior Publication Data
US 2023/0232011 A1    Jul. 20, 2023

Related U.S. Application Data

(60) Provisional application No. 63/036,200, filed on Jun. 8, 2020.

(51) Int. Cl.
*H04N 19/136* (2014.01)
*H04N 19/70* (2014.01)

(52) U.S. Cl.
CPC .......... *H04N 19/136* (2014.11); *H04N 19/70* (2014.11)

(58) Field of Classification Search
CPC ............................ H04N 19/136; H04N 19/70
See application file for complete search history.

(56) References Cited

U.S. PATENT DOCUMENTS

| | | | |
|---|---|---|---|
| 2016/0212437 A1* | 7/2016 | Tsukuba | H04N 19/44 |
| 2018/0176279 A1 | 6/2018 | Chalmers et al. | |
| 2019/0082188 A1* | 3/2019 | Tsukuba | H04N 19/44 |

FOREIGN PATENT DOCUMENTS

| | | |
|---|---|---|
| WO | 2015053120 A1 | 4/2015 |
| WO | 2017195582 A1 | 11/2017 |

OTHER PUBLICATIONS

Bross et al.; VVC_draft9; Apr. 2020 (Year: 2020).*
(Continued)

*Primary Examiner* — Jonathan R Messmore
(74) *Attorney, Agent, or Firm* — Rothwell, Figg, Ernst & Manbeck, P.C.

(57) ABSTRACT

There is provided a method for processing a bitstream. The method comprises determining a value, N, wherein N identifies a number of ordered layer representations, wherein N is greater than or equal to 3 such that the N ordered layer representations comprises a highest layer representation, a second highest layer representation, and a third highest layer representation. The method further comprises determining a value for the highest layer representation. The method comprises, after determining the value for the highest layer representation and before determining a value for the third highest layer representation, determining a value for the second highest layer representation. The method comprises, (Continued)

after determining the value for the second highest layer representation, determining a value for the third highest layer representation.

16 Claims, 8 Drawing Sheets

(56) References Cited

OTHER PUBLICATIONS

International Search Report and Written Opinion issued in International Application No. PCT/SE2021/050048 dated Mar. 30, 2021 (14 pages).
Samuelsson, J. et al., "AHG17: On Profile, tier, and level syntax structure", Joint Video Experts Team (JVET) of ITU-T SG 16 WP3 and ISO/IEC JTC 1/SC 29/WG 11, Document: JVET-P0217, 16th Meeting: Geneva, CH, Oct. 1-11, 2019 (2 pages).
Hendry, "AHG9: On signalling of sub-layer level idc", Joint Video Experts Team (JVET) of ITU-T SG 16 WP3 and ISO/IEC JTC 1/SC 29/WG 11, Document: JVET-S0203, 19th Meeting: by teleconference, Jun. 22-Jul. 2020 (3 pages).
Zhang, Z. et al., "AHG9: Order of the sublayer_level_idc[i] syntax elements", Joint Video Experts Team (JVET) of ITU-T SG 16 WP3 and ISO/IEC JTC 1/SC 29/WG 11, Document: JVET-S0207, 19th Meeting: by teleconference, Jun. 22-Jul. 1, 2020 (4 pages).
Bross, B. et al., "Versatile Video Coding (Draft 8)", Joint Video Experts Team (JVET) of ITU-T SG 16 WP3 and ISO/IEC JTC 1/SC 29/WG 11, Document: JVET-Q2001-vD, 17th Meeting: Brussels, BE Jan. 7-17, 2020 (512 pages).

* cited by examiner

DERIVATION OF A VALUE FOR EACH LAYER REPRESENTATION OF A BITSTREAM

CROSS REFERENCE TO RELATED APPLICATIONS

This application is a 35 U.S.C. § 371 National Stage of International Patent Application No. PCT/SE2021/050048, filed 2021 Jan. 27, which claims priority to U.S. provisional patent application No. 63/036,200, filed on 2020 Jun. 8. The above identified applications are incorporated by this reference.

TECHNICAL FIELD

Disclosed are embodiments related to determining a value (e.g., a level value) for each layer representation in a video bitstream.

BACKGROUND

1. HEVC and VVC

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VVC). The current version of the VVC draft specification at the time of writing this text is JVET-Q2001-vD.

2. Components

A video (a.k.a., video sequence) consists of a series of pictures (a.k.a., images) where each picture consists of one or more components. Each component can be described as a two-dimensional rectangular array of sample values. It is common that a picture in a video sequence consists of three components; one luma component Y where the sample values are luma values and two chroma components Cb and Cr, where the sample values are chroma values. It is also common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components.

3. Blocks and Units

A block is one two-dimensional array of samples. In video coding, each component is split into blocks and the coded video bitstream consists of a series of coded blocks. It is common in video coding that the image is split into units that cover a specific area of the image. Each unit consists of all blocks from all components that make up that specific area and each block belongs fully to one unit. The macroblock in H.264 and the Coding unit (CU) in HEVC are examples of units.

A block can alternatively be defined as a two-dimensional array that a transform used in coding is applied to. These blocks are known under the name "transform blocks." Alternatively, a block can be defined as a two-dimensional array that a single prediction mode is applied to. These blocks can be called "prediction blocks". In this application, the word block is not tied to one of these definitions but that the descriptions herein can apply to either definition.

4. Residuals, Transforms, and Quantization

A residual block consists of samples that represents sample value differences between sample values of the original source blocks and the prediction blocks. The residual block is processed using a spatial transform. In the encoder, the transform coefficients are quantized according to a quantization parameter (QP) which controls the precision of the quantized coefficients. The quantized coefficients can be referred to as residual coefficients. A high QP value would result in low precision of the coefficients and thus low fidelity of the residual block. A decoder receives the residual coefficients, applies inverse quantization and inverse transform to derive the residual block.

5. NAL Units

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC begins with a header which specifies the NAL unit type of the NAL unit that identifies what type of data is carried in the NAL unit, the layer ID and the temporal ID for which the NAL unit belongs to. The NAL unit type is transmitted in the nal_unit_type codeword in the NAL unit header and the type indicates and defines how the NAL unit should be parsed and decoded. The rest of the bytes of the NAL unit is payload of the type indicated by the NAL unit type. A bitstream consists of a series of concatenated NAL units.

The syntax for the NAL unit header for HEVC is shown in

TABLE 1

| Table 1 - HEVC NAL unit header syntax | |
| --- | --- |
| | Descriptor |
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

The syntax for the NAL unit header in the current version of the VVC draft is shown in

TABLE 2

| Table 2 - VVC NAL unit header syntax | |
| --- | --- |
| | Descriptor |
| nal_unit_header( ) { | |
|   forbidden_zero_bit | f(1) |

TABLE 2-continued

Table 2 - VVC NAL unit header syntax

| | Descriptor |
|---|---|
| nuh_reserved_zero_bit | u(1) |
| nuh_layer_id | u(6) |
| nal_unit_type | u(5) |
| nuh_temporal_id_plus1 | u(3) |
| } | |

The NAL unit types of the current VVC draft are shown in Table 3.

The decoding order is the order in which NAL units shall be decoded, which is the same as the order of the NAL units within the bitstream. The decoding order may be different from the output order, which is the order in which decoded pictures are to be output, such as for display, by the decoder.

TABLE 3

NAL unit types in VVC

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

6. Parameter Sets

HEVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs.

The current version of VVC also specifies one additional parameter set, the adaptation parameter set (APS). The APS may contain information that can be used for multiple slices and two slices of the same picture can use different. APS carries parameters needed for the adaptive loop filter (ALF) tool and the luma mapping and chroma scaling (LMCS) tool.

7. Decoding Capability Information (DCI)

DCI specifies information that may not change during the decoding session and may be good for the decoder to know about, e.g. the maximum number of allowed sub-layers. The information in DCI is not necessary for operation of the decoding process. In previous drafts of the VVC specification the DCI was called decoding parameter set (DPS).

The decoding capability information also contains a set of general constraints for the bitstream that gives the decoder information of what to expect from the bitstream in terms of coding tools, types of NAL units, etc. In the current version of VVC, the general constraint information could also be signaled in VPS or SPS.

8. Profile, Tier and Level

In VVC, the profile, tier and level information for a bitstream is signaled in the bitstream itself. For multi-layer bitstreams, the information is signaled in the VPS and for single-layer bitstreams the information is signaled in the SPS. The syntax for the SPS signaling is shown in Tables 4 and 5:

TABLE 4

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
| ... | |

TABLE 5

| | | Descriptor |
|---|---|---|
| | profile_tier_level( profileTierPresentFlag, maxNumSubLayersMinus1 ) { | |
| 1. |   if( profileTierPresentFlag ) { | |
| 2. |     general_profile_idc | u(7) |
| 3. |     general_tier_flag | u(1) |
| 4. |     general_constraint_info( ) | |
| 5. |   } | |
| 6. |   general_level_idc | u(8) |
| 7. |   if( profileTierPresentFlag ) { | |
| 8. |     ptl_num_sub_profiles | u(8) |
| 9. |     for( i = 0; i < ptl_num_sub_profiles; i++ ) | |
| 10. |       general_sub_profile_idc[ i ] | u(32) |
| 11. |   } | |
| 12. |   for( i = 0; i < maxNumSubLayersMinus1; i++ ) | |
| 13. |     ptl_sublayer_level_present_flag[ i ] | u(1) |
| 14. |   while( !byte_aligned( ) ) | |
| 15. |     ptl_alignment_zero_bit | f(1) |
| 16. |   for( i = 0; i < maxNumSubLayersMinus1; i++ ) | |
| 17. |     if( ptl_sublayer_level_present_flag[ i ] ) | |
| 18. |       sublayer_level_idc[ i ] | u(8) |
| 19. | } | |

The semantics of general_level_idc and sublayer_level_idc[i] in the current version of VVC are as follows where OlsInScope is the set of output layers in scope for the bitstream.

general_level_idc indicates a level to which OlsInScope conforms as specified in Annex A. Bitstreams shall not contain values of general_level_idc other than those specified in Annex A. Other values of general_level_idc are reserved for future use by ITU-T | ISO/JEC. NOTE 1—A greater value of general_level_idc indicates a higher level. The maximum level signalled in the DCI NAL unit for OlsInScope may be higher than but cannot be lower than the level signalled in the SPS for a CLVS contained within OlsInScope. NOTE 2—When OlsInScope conforms to multiple profiles, general_profile_idc should indicate the profile that provides the preferred decoded result or the preferred bitstream identification, as determined by the encoder (in a manner not specified in this Specification). NOTE 3—When the CVSs of OlsInScope conform to different profiles, multiple profile_tier_level( ) syntax structures may be included in the DCI NAL unit such that for each CVS of the OlsInScope there is at least one set of indicated profile, tier, and level for a decoder that is capable of decoding the CVS.

The semantics of the syntax element sublayer_level_idc[i] is, apart from the specification of the inference of not present values, the same as the syntax element general_level_idc, but apply to the sublayer representation with TemporalId equal to i.

When not present, the value of sublayer_level_idc[i] is inferred as follows: a) sublayer_level_idc[maxNumSubLayersMinus1] is inferred to be equal to general_level_idc of the same profile_tier_level( ) structure, and b) for i from maxNumSubLayersMinus1−1 to 0 (in decreasing order of values of i), inclusive, sublayer_level_idc[i] is inferred to be equal to sublayer_level_idc[i+1].

In the VVC decoding process, the decoder derives (maxNumSubLayersMinus1+1) level values from the coded video bitstream. When profile_tier_level( ) is present in the SPS, the number of level values is decoded from the sps_max_sublayers_minus1 syntax element. Each level value specifies the level value for the i-th layer representation where i=0 is the lowest layer representation and i=maxNumSubLayersMinus1 is the highest layer representation. The level value is in VVC referred to as sublayer_level_idc[i], where the index variable i can have a value in the range of {0, 1, . . . , maxNumSubLayersMinus1}, inclusive. maxNumSubLayersMinus1 must be equal to or greater than 0.

SUMMARY

As seen from the semantics, the value of sublayer_level_idc[i] in VVC is derived as follows: a) when i is equal to maxNumSubLayersMinus1, the value of sublayer_level_idc[i] is set equal to general_level_idc, and b) when i is less than maxNumSubLayersMinus1, if sublayer_level_idc[i] is signaled in the bitstream, then the value of sublayer_level_idc[i] is derived from decoding the coded bitstream, otherwise (i.e., the sublayer_level_idc[i] syntax element is not present in the bitstream), the value of sublayer_level_idc[i] is set equal to the value of sublayer_level_idc[i+1].

Certain challenges presently exist. For instance, in the current version of VVC, when the value of maxNumSubLayersMinus1 is equal to or greater than 2, the decoder is required to scan the array sublayer_level_idc[i] twice to set the level values as follows:

A) in a first scan, which is done in increasing order of the index i (i.e., i starts at 0 and ends at maxNumSubLayersMinus1−1), determine for each value of i whether sublayer_level_idc[i] is signaled in the bitstream or not, and when it is determined that sublayer_level_idc[i] is signaled in the bitstream, decode the corresponding syntax element and set sublayer_level_idc[i] to the value of the decoded syntax element; and B) in a second scan, done in decreasing order of the index i (i.e., i starts at maxNumSubLayersMinus1−1 and ends at 0), determine for each value of i whether sublayer_level_idc[i] is signaled in the bitstream or not, and when it is determined sublayer_level_idc[i] is not signaled in the bitstream, set the value of sublayer_level_idc[i] to be equal to sublayer_level_idc[i+1].

The reason why two scans are necessary is that the parsing/decoding of sublayer_level_idc[i] is in increasing order of the index i while the inference of sublayer_level_idc[i] is in decreasing order of the index i.

This disclosure provides a solution by providing a method where the values of the sublayer_level_idc[i] array are set using a single scan by modifying the parsing/decoding of sublayer_level_idc[i] to be done in decreasing order of index i, so that when sublayer_level_idc[i] is not signaled in the bitstream, the inferred value to use is already available since for any i in the range of 0 to maxNumSubLayersMinus1−1, the value of sublayer_level_idc[i+1] has either already been decoded from the bitstream or been set to an inferred value.

According to a first aspect of the present disclosure, there is provided a method for processing a bitstream. The method comprises determining a value, N, wherein N identifies a number of ordered layer representations, wherein N is greater than or equal to 3 such that the N ordered layer representations comprises a highest layer representation, a second highest layer representation, and a third highest layer representation. The method further comprises determining a value for the highest layer representation. The method comprises, after determining the value for the highest layer representation and before determining a value for the third highest layer representation, determining a value for the second highest layer representation. The method comprises, after determining the value for the second highest layer representation, determining a value for the third highest layer representation.

According to a second aspect of the present disclosure, there is provided a computer program comprising instructions which, when executed by processing circuitry, causes the processing circuitry to perform the method according to the first aspect.

According to a third aspect of the present embodiments, there is provided a carrier comprising the computer program according to the second aspect, wherein the carrier is one of an electronic signal, an optical signal, a radio signal, and a computer readable storage medium.

According to a fourth aspect of the present disclosure, there is provided an apparatus, the apparatus being adapted to perform the method according to the first aspect.

At least one of the aspect provides an advantage of reducing decoding complexity. Namely, the modification proposed in the present disclosure ensures the order of the values in the bitstream to be in the reverse order compared with the current VVC draft specification. By setting the values of the sublayer_level_idc[i] array in a single pass, the decoding complexity is significantly reduced.

BRIEF DESCRIPTION OF THE DRAWINGS

The accompanying drawings, which are incorporated herein and form part of the specification, illustrate various embodiments.

DETAILED DESCRIPTION

Figure 1:
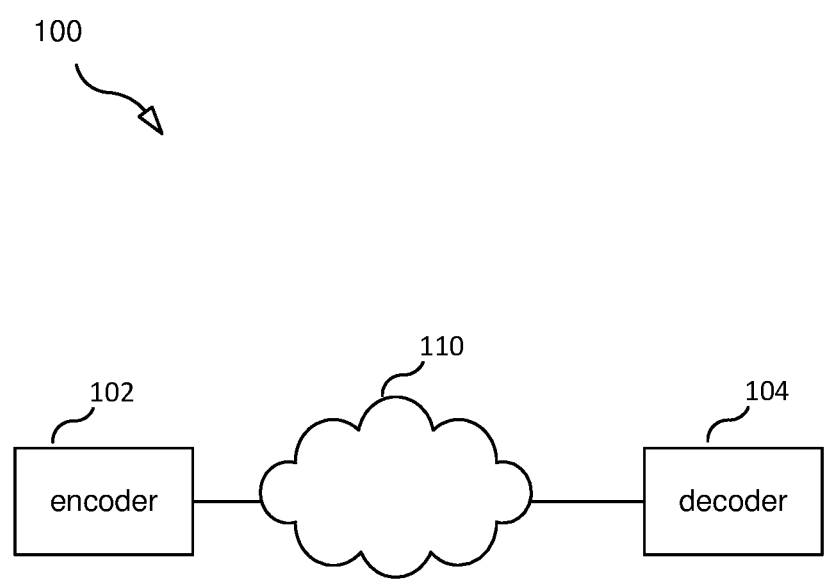
FIG. 1 illustrates a system according to an example embodiment.

FIG. 1 illustrates a system 100 according to an example embodiment. System 100 includes an encoder 102 in communication with a decoder 104 via a network 110 (e.g., the Internet or other network).

Figure 2:
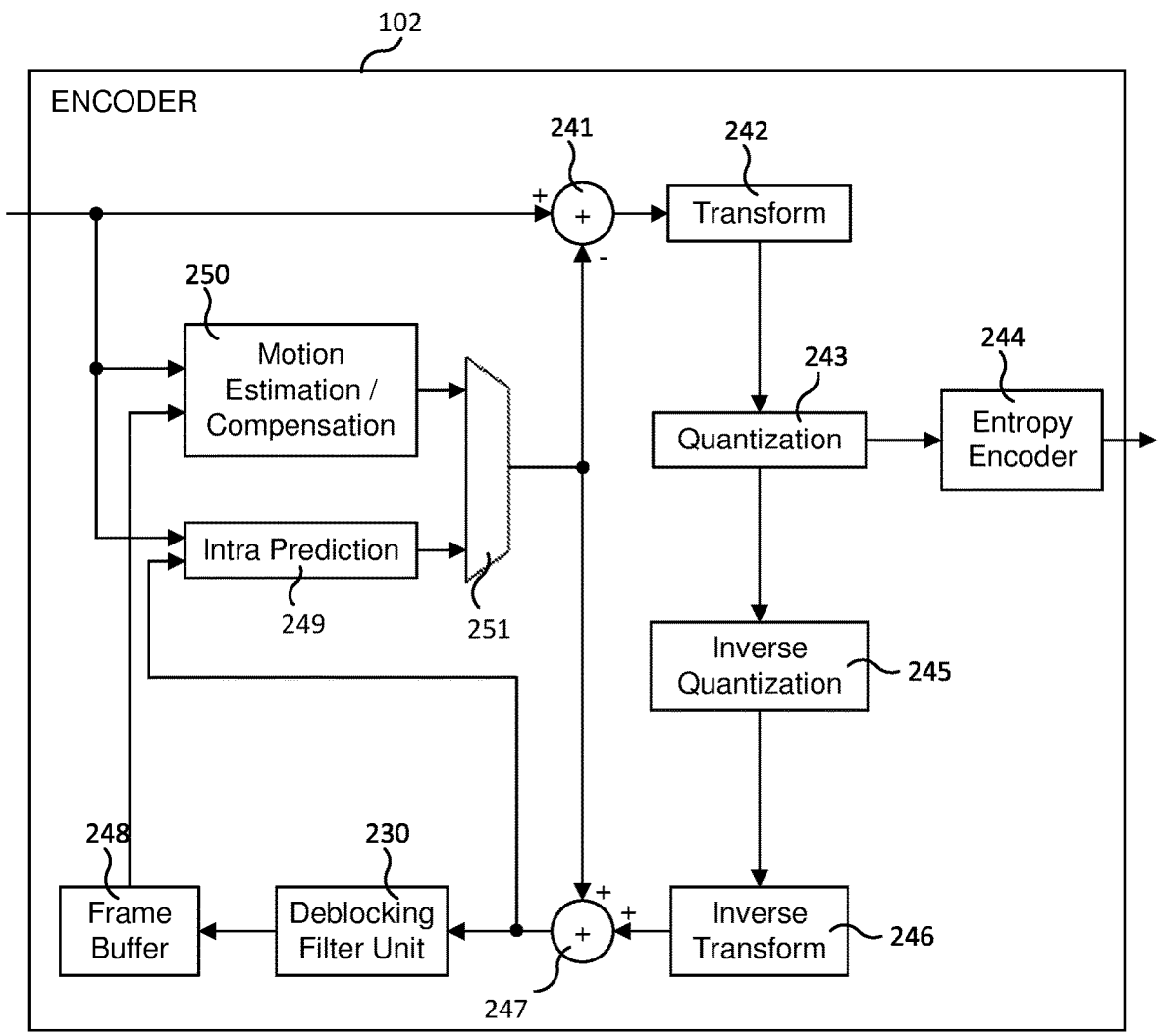
FIG. 2 is a schematic block diagram of an encoder according to an embodiment.

FIG. 2 is a schematic block diagram of encoder 102 for encoding a block of pixel values (hereafter "block") in a video frame (picture) of a video sequence according to an embodiment. A current block is predicted by performing a motion estimation by a motion estimator 250 from an already provided block in the same frame or in a previous frame. The result of the motion estimation is a motion or displacement vector associated with the reference block, in the case of inter prediction. The motion vector is utilized by a motion compensator 250 for outputting an inter prediction of the block. An intra predictor 249 computes an intra prediction of the current block. The outputs from the motion estimator/compensator 250 and the intra predictor 249 are input in a selector 251 that either selects intra prediction or inter prediction for the current block. The output from the selector 251 is input to an error calculator in the form of an adder 241 that also receives the pixel values of the current block. The adder 241 calculates and outputs a residual error as the difference in pixel values between the block and its prediction. The error is transformed in a transformer 242, such as by a discrete cosine transform, and quantized by a quantizer 243 followed by coding in an encoder 244, such as by entropy encoder. In inter coding, also the estimated motion vector is brought to the encoder 244 for generating the coded representation of the current block. The transformed and quantized residual error for the current block is also provided to an inverse quantizer 245 and inverse transformer 246 to retrieve the original residual error. This error is added by an adder 247 to the block prediction output from the motion compensator 250 or the intra predictor 249 to create a reference block that can be used in the prediction and coding of a next block. This new reference block is first processed by a deblocking filter unit 230 according to the embodiments in order to perform deblocking filtering to combat any blocking artifact. The processed new reference block is then temporarily stored in a frame buffer 248, where it is available to the intra predictor 249 and the motion estimator/compensator 250.

Figure 3:
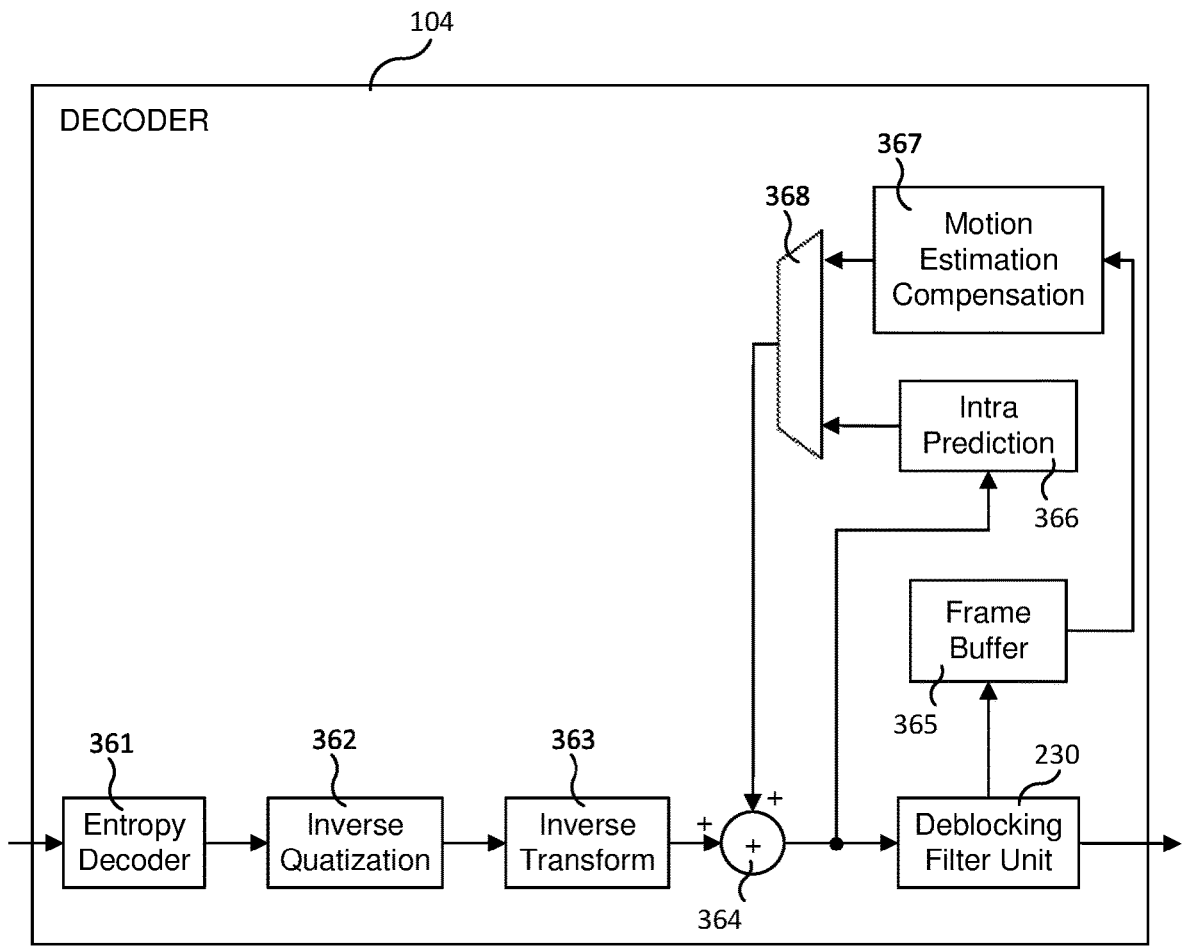
FIG. 3 is a schematic block diagram of a decoder according to an embodiment.

FIG. 3 is a corresponding schematic block diagram of decoder 104 according to some embodiments. The decoder 104 comprises a decoder 361, such as entropy decoder, for decoding an encoded representation of a block to get a set of quantized and transformed residual errors. These residual errors are dequantized in an inverse quantizer 362 and inverse transformed by an inverse transformer 363 to get a set of residual errors. These residual errors are added in an adder 364 to the pixel values of a reference block. The reference block is determined by a motion estimator/compensator 367 or intra predictor 366, depending on whether inter or intra prediction is performed. A selector 368 is thereby interconnected to the adder 364 and the motion estimator/compensator 367 and the intra predictor 366. The resulting decoded block output form the adder 364 is input to a deblocking filter unit 230 according to the embodiments in order to deblocking filter any blocking artifacts. The filtered block is output form the decoder 504 and is furthermore preferably temporarily provided to a frame buffer 365 and can be used as a reference block for a subsequent block to be decoded. The frame buffer 365 is thereby connected to the motion estimator/compensator 367 to make the stored blocks of pixels available to the motion estimator/compensator 367. The output from the adder 364 is preferably also input to the intra predictor 366 to be used as an unfiltered reference block.

Embodiments

In the description below, various embodiments are described that solve one or more of the above described problems. It is to be understood by a person skilled in the art that two or more embodiments, or parts of embodiments, may be combined to form new solutions which are still covered by this disclosure.

In the embodiments below, given an array X[i] that has N elements, increasing scan order is defined as a loop through each element in X[i] starting with i equal to 0 and ending with i equal to (N−1), and decreasing scan order is defined as a loop through each element in X[i] starting with i equal to (N−1) and ending with i equal to 0.

Figure 4:
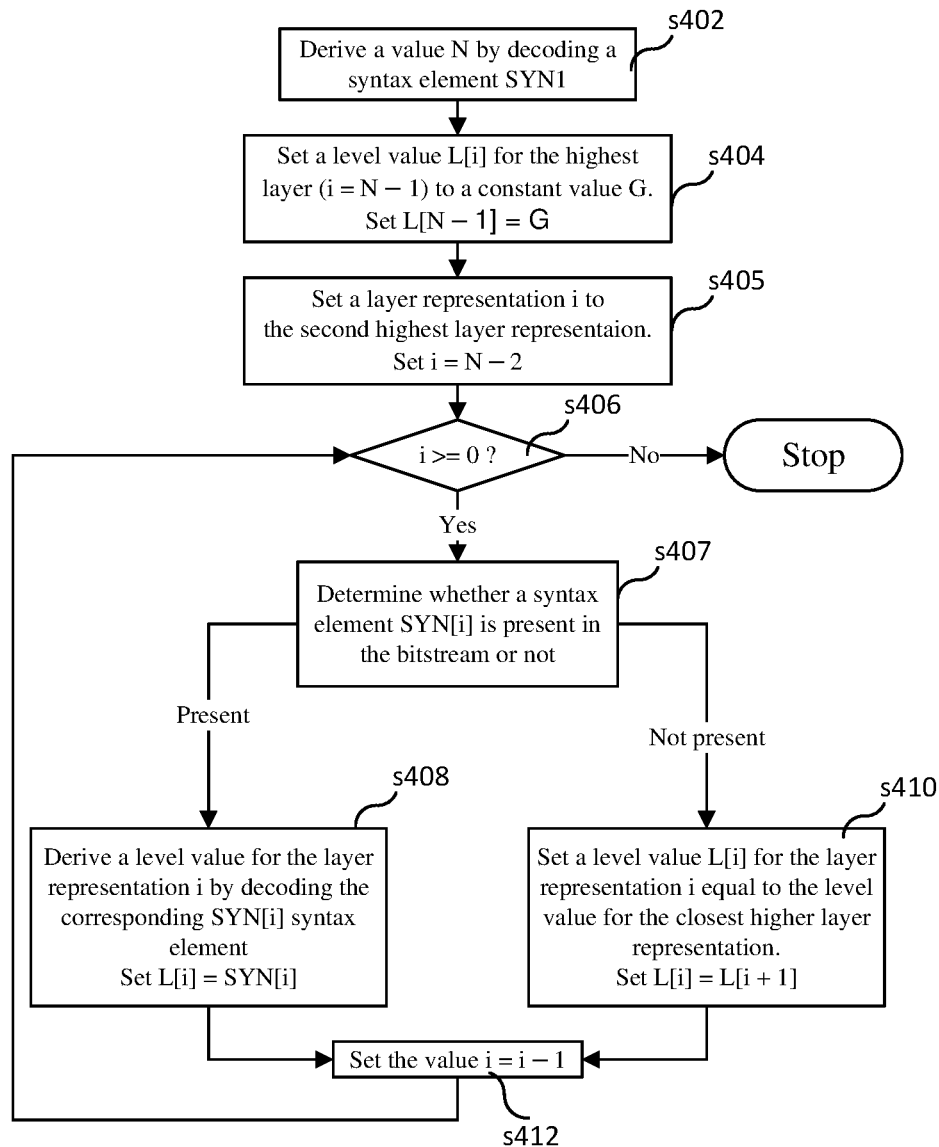
FIG. 4 is a flowchart illustrating a process according to an embodiment.

FIG. 4 is a flow chart illustrating a process 400, according to an embodiment, for deriving at least N values (e.g., N level values) for N corresponding layer representations from a coded video bitstream. Decoder 104 may perform some or all of the steps of process 400. Process 400 may begin in step s402. In one embodiment, each one of the N layer representations is a temporal sublayer representation and the variable i (described below) may represent a temporal sublayer ID (TemporalId).

Step s402 comprises deriving a value N, wherein the value N represents the number of layer representations that are present in the coded video bitstream, and wherein the value N is derived from a syntax element SYN1 in the coded video bitstream. The value N here may be a value that is larger than 2.

After step s402, N values L[i] for i=0 to N−1 are derived, wherein each value L[i] corresponds to the i-th layer representation in the coded video bitstream and wherein each value L[i] specifies a level for the i-th layer representation, and further wherein the values L[i] are derived in decreasing scan order from the highest layer representation (e.g. i equal to N−1) to the lowest layer representation (e.g. i equal to 0) (see steps s404 to step s412).

In step s404, the value of L[N−1] is set equal to a particular value (denoted "G") (step s404). After steps s404, steps s405 and s406 are performed, where in step s405 i is set equal to N−2 and in step s406 it is determined whether i is greater than or equal to zero. If i is greater than or equal to zero, the process proceeds to step s407, other the process ends. Step s407 comprises determining whether a syntax element SYN[i] for the i-th layer representation is present in the coded video bitstream or not.

If the corresponding syntax element SYN[i] is determined to be present in the coded video bitstream, then step s408 is performed, otherwise step s410 is performed. Step s408 comprises deriving the value of L[i] by decoding the corresponding SYN[i] syntax element, wherein the syntax element SYN[i] represents a level value L[i] for the i-th layer representation (e.g., L[i] is set equal to SYN[i]). Step s410 comprises setting the value of L[i] equal to the value of L[i+1]. In an alternative version of this embodiment, step s410 is modified such that L[i] is set equal to L[j], where j>i and j<N, rather than set L[i] equal to L[i+1]. Step s412 comprises decrementing i. After step s412 is performed, the process goes back to step s406.

In one embodiment, the particular value (i.e., denoted G above) is derived from a syntax element (denoted SYN2) in the coded video bitstream, and wherein the value G is a general level value. The syntax element SYN2 may be a syntax element with the name general_level_idc. The syntax element may be present in an SPS and/or a VPS in the coded video bitstream.

In one embodiment, process 400 further includes deriving an ordered set of values V[i] (i=0 to i=(N−1)) from (N−1) syntax elements in the coded video bitstream, wherein each value V[i] corresponds to the i-th layer representation in the coded video bitstream and wherein each value V[i] indicates whether there is a syntax element SYN[i] for the i-th layer representation present in the coded video bitstream or not. In this embodiment, the determining whether a syntax element SYN[i] for the i-th layer representation is present in the coded video bitstream or not in step s407 comprises determining the value of the corresponding value V[i]. In one embodiment, each of the (N−1) syntax elements is a one bit flag. In the bitstream, the order of syntax elements may be such that all V[i] syntax elements precede (i.e., come before) any SYN[i] syntax elements. The order of the SYN[i] syntax elements must be such that when m is larger than n, SYN[m] precedes SYN[n] in the bitstream. In other words, the SYN[i] syntax elements are in the bitstream ordered in decreasing order of i. The syntax elements V[i] may in the bitstream be ordered in increasing or decreasing order of i.

Figure 5:
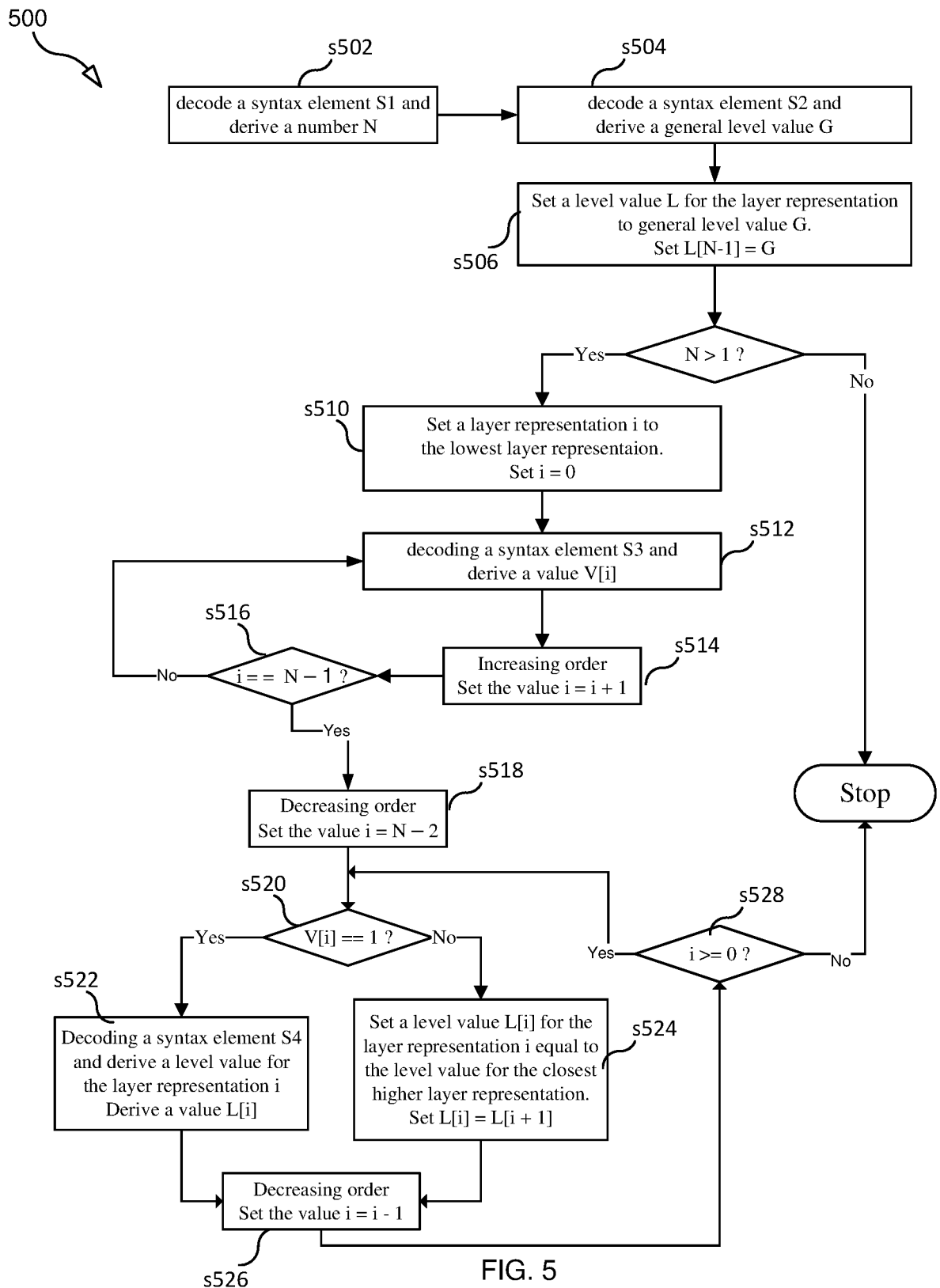
FIG. 5 is a flowchart illustrating a process according to an embodiment.

FIG. 5 is a flow chart illustrating a process 500, according to another embodiment, for deriving at least N level values (L[i] for i=0 to i=N−1) for N corresponding layer representations (e.g., N corresponding temporal sublayer representations) from a coded video bitstream. Decoder 104 may perform some or all of the steps of process 500. Process 500 may begin in step s502.

Step s502 comprises decoding a syntax element S1 from the bitstream and deriving a number N of layer representations present in the bitstream from S1 (e.g., S1 may be vps_ptl_max_temporal_id[i] or sps_max_sublayers_minus1).

Step s504 comprises decoding a syntax element S2 from the bitstream and deriving a general level value G from the decoded S2 value.

Step s506 comprises setting L[N−1] to G.

If N is equal to 1, then process 500 is finished, otherwise process 500 proceeds to step s510, where the variable i is set to 0. After step s510, steps s512, s514, and s516 are performed until i reaches N−1.

In step s512, for layer representation i, a syntax element S3 is decoded from the bitstream and a value V[i] is derived from the decoded value, where V [i] determines whether a syntax element S4 representing a level value for the respective layer representation (i.e., the ith layer representation is present in the bitstream or not). Step s514 comprises incrementing i by one (i.e., i=i+1). Step s516 comprises determining whether i=N−1. If i=N−1, process 500 proceeds to step s518, otherwise process 500 goes back to step s512. As illustrated in FIG. 5, in this embodiment, the decoder order of syntax elements S3 and the derivation of the V [i] values are done in increasing order from the lowest layer representation (e.g. i=0) to the second highest layer representation (e.g. i=N−2).

Once all of the V[i] values are obtained, then a level value L[i] for each of the layer representations (e.g. layer representations=i) is derived by a single pass from the highest layer representation (i.e., i=N−1) to the lowest layer representation (i.e., i=0). That is, steps s518 to s528 are performed.

Step s518 comprises setting i=N−2.

Step s520 comprise determining if the value of the corresponding syntax element S3 specifies that a corresponding syntax element S4 is present in the bitstream. In one embodiment (shown in FIG. 5), this comprises determining whether or not V[i] is equal to 1. In this embodiment, if V[i] is equal to 1, then the corresponding syntax element S4 is present in the bitstream and process 500 proceeds to steps s522, otherwise the corresponding syntax element S4 is not present in the bitstream and process 500 proceeds to step s524.

Step s522 comprises decoding the corresponding S4 syntax element and deriving a level value L[i] for the layer representation from S4 (e.g., setting L[i] equal to the decoded corresponding S4 syntax element).

Step s524 comprises setting the level value L[i] for the layer representation equal to the level value for the closest higher layer representation (e.g., setting L[i] equal to L[i+1]).

Steps s526 comprises setting i=i−1. And step s528 comprises determining whether i is greater than or equal to 0. If it is not, then process 500 finishes, otherwise process 500 goes back to step s520.

The number of layer representations (e.g. i) may be a number of temporal sublayer representations, and the level value L[i] may be a temporal sublayer level value.

In some embodiments, one or more of the steps of process 500 (e.g., steps s510 to s528) are performed by decoder 104 when decoder 104 is decoding the syntax structure profile_tier_level( ). The names for constant values and syntax table in the decoding steps can be mapped to the names in the syntax structure as follows in table 6:

TABLE 6

| Name in decoding steps | Name in syntax structure | Variable name in decoding steps |
|---|---|---|
| N | maxNumSubLayersMinus1 | N = maxNumSubLayersMinus1 + 1 |
| S2 | general_level_idc | G |
| S3 | sublayer_level_present_flag[i] | V[i], i in range {0, N − 2}, inclusive |
| S4 | sublayer_level_idc[i] | L[i], i in range {0, . . . , N − 1}, inclusive |

In one embodiment, the profile_tier_level( ) is defined as follows in table 7:

TABLE 7

| | Descriptor |
|---|---|
| profile_tier_level( profileTierPresentFlag, maxNumSubLayersMinus1 ) { | |
| 1.  if( profileTierPresentFlag ) { | |
| 2.    general_profile_idc | u(7) |
| 3.    general_tier_flag | u(1) |
| 4.    general_constraint_info( ) | |
| 5.  } | |
| 6.  general_level_idc | u(8) |
| 7.  if( profileTierPresentFlag ) { | |
| 8.    num_sub_profiles | u(8) |
| 9.    for( i = 0; i < num_sub_profiles; i++ ) | |
| 10.      general_sub_profile_idc[ i ] | u(32) |
| 11.  } | |
| 12.  for( i = 0; i < maxNumSubLayersMinus1; i++ ) | |
| 13.    sublayer_level_present_flag[ i ] | u(1) |
| 14.  while( !byte_aligned( ) ) | |
| 15.    ptl_alignment_zero_bit | f(1) |
| 16.  for( i = maxNumSubLayersMinus1 − 1; i >= 0; i −− ) | |
| 17.    if( sublayer_level_present_flag[ i ] ) | |
| 18.      sublayer_level_idc[ i ] | u(8) |
| 19. } | |

Comparing Table 7 to Table 5, one case see that row 16 of Table 7 differs from row 16 of Table 5. Specifically, in row 16 of Table 7, the variable i is initialized to (maxNumSubLayersMinus1−1) and is then decremented until it reaches −1, whereas in row 16 of Table 5, the variable i is initialized to 0 and then incremented until it reaches maxNumSubLayersMinus1. Accordingly, assuming that sublayer_level_present_flag[i] and sublayer_level_present_flag[i−1] are both set to 1 (i.e., the bitstream contains both sublayer_level_idc[i] and sublayer_level_idc[i−1], then syntax element sublayer_level_idc[i] precedes syntax element sublayer_level_idc[i−1] in a bitstream.

In this embodiment shown in Table 7, the semantics of sublayer_level_idc[i] is as follows:

sublayer_level_idc[i] indicates a level for the sublayer representation with Temporal d equal to i. When not present, the value of sublayer_level_idc[i] is inferred as follows: sublayer_level_idc[maxNumSubLayersMinus1] is inferred to be equal to general_level_idc of the same profile_tier_level( ) structure, and for i from maxNumSubLayersMinus1−1 to 0 (in decreasing order of values of i), inclusive, sublayer_level_idc[i] is inferred to be equal to sublayer_level_idc[i+1].

In another embodiment, the profile_tier_level( ) is defined as follows in table 8:

TABLE 8

| | Descriptor |
|---|---|
| profile_tier_level( profileTierPresentFlag, maxNumSubLayersMinus1 ) { | |
| 20.   if( profileTierPresentFlag ) { | |
| 21.     general_profile_idc | u(7) |
| 22.     general_tier_flag | u(1) |
| 23.     general_constraint_info( ) | |
| 24.   } | |
| 25.   general_level_idc | u(8) |
| 26.   if( profileTierPresentFlag ) { | |
| 27.     num_sub_profiles | u(8) |
| 28.     for( i = 0; i < num_sub_profiles; i++ ) | |
| 29.       general_sub_profile_idc[ i ] | u(32) |
| 30.   } | |
| 31.   for( i = 0; i < maxNumSubLayersMinus1; i++ ) | |
| 32.     sublayer_level_present_flag[ i ] | u(1) |
| 33.   while( !byte_aligned( ) ) | |
| 34.     ptl_alignment_zero_bit | f(1) |
| 35.   for( i = 0; i < maxNumSubLayersMinus1; i ++ ) | |
| 36.     if( sublayer_level_present_flag[ maxNumSubLayersMinus1 −1 − i ] ) | |
| 37.       sublayer_level_idc[ maxNumSubLayersMinus1 −1 − i ] | u(8) |
| 38. } | |

In this embodiment shown in Table 8, the loop index variable (denoted with "i" in the syntax table above) starts from 0 and ends at the highest value, in increasing order that is. However, the check of the sublayer_level_present_flag[ ] values and parsing of the sublayer_level_idc[ ] syntax elements is done in decreasing index order. Accordingly, this embodiment is equivalent to embodiments disclosed above but expressed in an alternative way.

In another embodiment, the example syntax tables are the same (or unchanged) compared to the current version of VVC. S1 is one syntax element in the decoding steps. In the example syntax tables, S is vps_ptl_max_temoral_id[i] or sps_max_sublayers_minus1 in the VPS and SPS, respectively. The value N is equal to the decoded value of the syntax element S1 plus one.

S1 is vps_ptl_max_temporal_id[i] in the VPS

| | Descriptor |
|---|---|
| video_parameter_set_rbsp( ) { | |
|   ... | ... |
|   vps_num_ptls_minus1 | u(8) |
|   for( i = 0; i <= vps_num_ptls_minus1; i++ ) { | |
|     if ( i > 0 ) | |
|       vps_pt_present_flag[ i ] | u(1) |
|     if( !vps_all_layers_same_num_sublayers_flag ) | |
|       vps_ptl_max_temporal_id[ i ] | u(3) |
|   } | |
|   while( !byte_aligned( ) ) | |
|     vps_ptl_alignment_zero_bit /* equal to 0 */ | f(1) |

| | Descriptor |
|---|---|
| for( i = 0; i <= vps_num_ptls_minus1; i++ )<br>   profile_tier_level( vps_pt_present_flag[ i ], vps_ptl_max_temporal_id[ i ] )<br>... | ... |

| | Descriptor |
|---|---|
| seq_parameter_set_rbsp( ) {<br>  ...<br>  sps_video_parameter_set_id<br>  sps_max_sublayers_minus1<br>  sps_reserved_zero_4bits<br>  sps_ptl_dpb_hrd_params_present_flag<br>  if( sps_ptl_dpb_hrd_params_present_flag )<br>    profile_tier_level( 1, sps_max_sublayers_minus1 )<br>  ... | <br><br>u(4)<br>u(3)<br>u(4)<br>u(1)<br><br><br>... |

Figure 6:
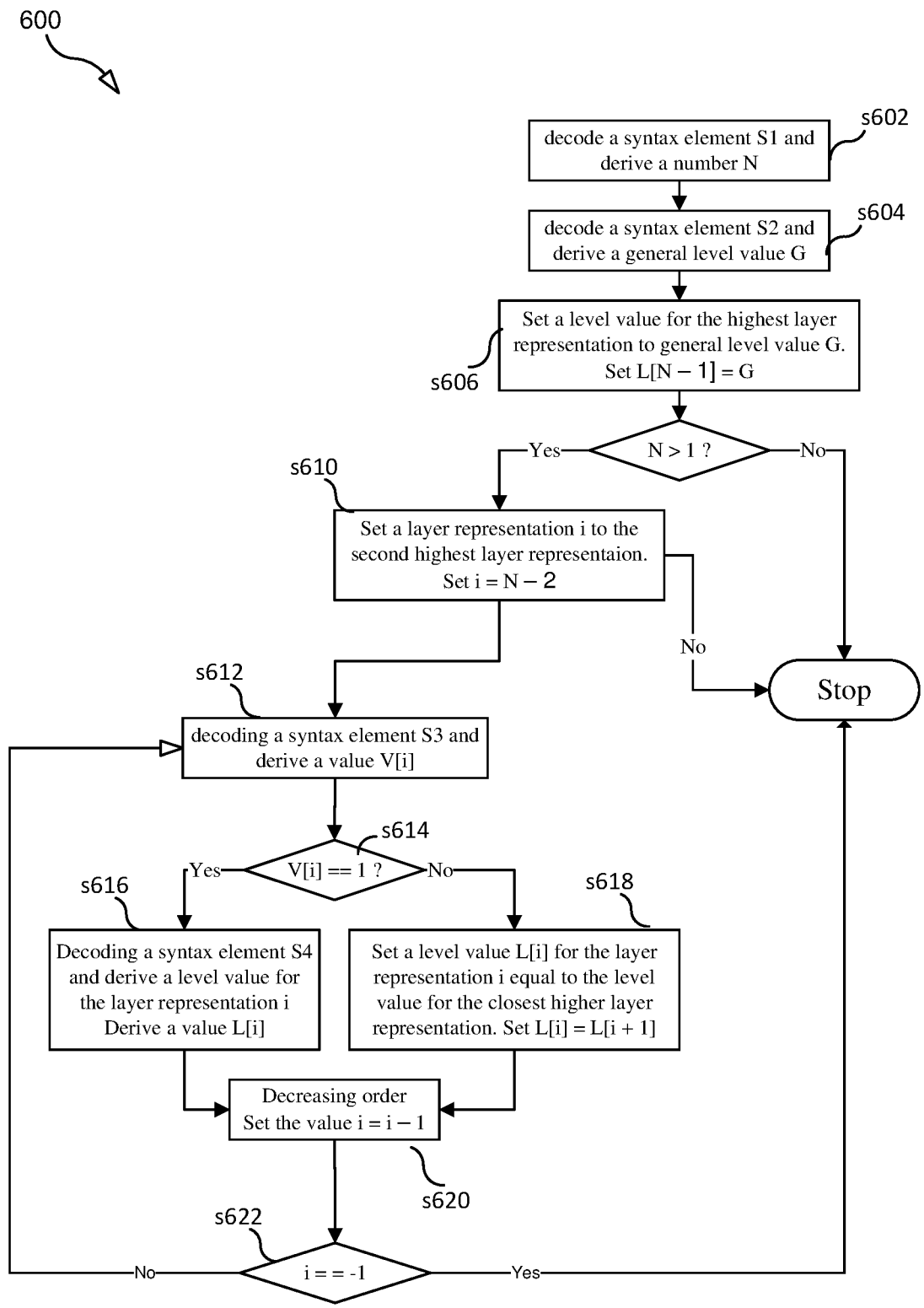
FIG. 6 is a flowchart illustrating a process according to an embodiment.
Figure 7:
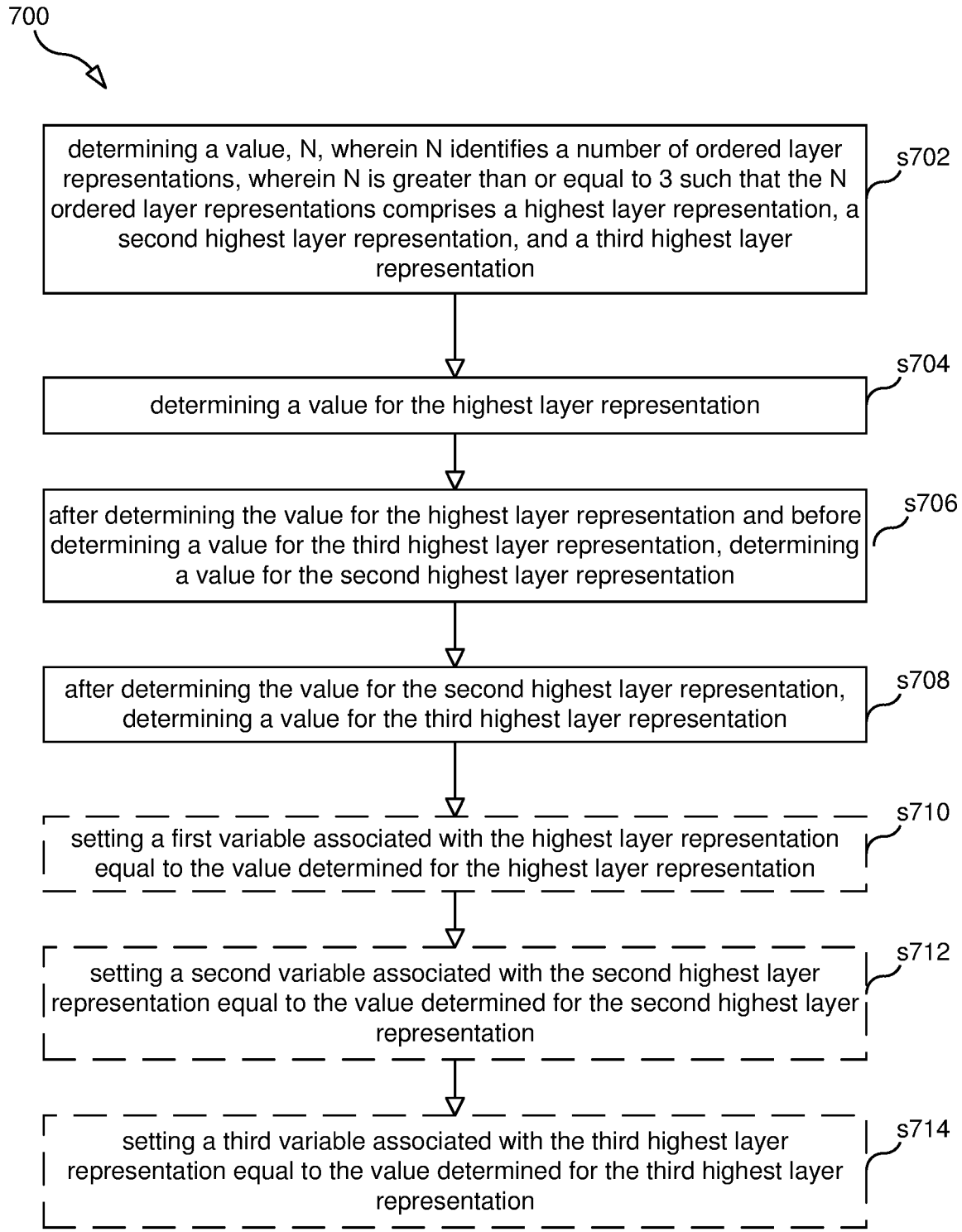
FIG. 7 is a flowchart illustrating a process according to an embodiment.

FIG. 6 is a flow chart illustrating a process 600, according to another embodiment, for deriving at least N level values for N corresponding layer representations (e.g., N corresponding temporal sublayer representations) from a coded video bitstream. Process 600 is similar to process 500 but uses a single loop rather than two loops. Process 600 may begin in step s602.

Step s602 comprises decoding a syntax element S1 from the bitstream and deriving a number N of layer representations present in the bitstream from S1 (e.g., S1 may be vps_ptl_max_temporal_id[i] or sps_max_sublayers_minus1).

Step s604 comprises decoding a syntax element S2 from the bitstream and deriving a general level value G from the decoded S2 value.

Step s606 comprises setting L[N−1] to G.

If N is equal to 1, then process 600 is finished, otherwise process 600 proceeds to step s610.

Step s610 comprises setting the variable i to N−2. After step s610, step s612 to step s622 are performed until i reaches −1.

In step s612, for layer representation i, a syntax element S3 is decoded from the bitstream and a value V[i] is derived from the decoded value, where V[i] determines whether a syntax element S4 representing a level value for the respective layer representation (i.e., the ith layer representation is present in the bitstream or not).

Step s614 comprise determining if the value of the corresponding syntax element S3 specifies that a corresponding syntax element S4 is present in the bitstream. In one embodiment (shown in FIG. 6), this comprises determining whether or not V[i] is equal to 1. In this embodiment, if V[i] is equal to 1, then the corresponding syntax element S4 is present in the bitstream and process 600 proceeds to steps s616, otherwise the corresponding syntax element S4 is not present in the bitstream and process 600 proceeds to step s618.

Step s616 comprises decoding the corresponding S4 syntax element and deriving a level value L[i] for the layer representation from S4 (e.g., setting L[i] equal to the decoded corresponding S4 syntax element).

Step s618 comprises setting the level value L[i] for the layer representation equal to the level value for the closest higher layer representation (e.g., setting L[i] equal to L[i+1]).

Steps s620 comprises setting i=i−1. And step s622 comprises determining whether i is equal to −1. If it is, then process 600 finishes, otherwise process 600 goes back to step s612.

In this embodiment, the profile_tier_level( ) is defined as follows in table 9:

TABLE 9

| | Descriptor |
|---|---|
| profile_tier_level( profileTierPresentFlag, maxNumSubLayersMinus1 ) {<br>  if( profileTierPresentFlag ) {<br>    general_profile_idc<br>    general_tier_flag<br>    general_constraint_info( )<br>  }<br>  general_level_idc<br>  if( profileTierPresentFlag ) {<br>    num_sub_profiles<br>    for( i = 0; i < num_sub_profiles; i++ )<br>      general_sub_profile_idc[ i ]<br>  }<br>  for( i = maxNumSubLayersMinus1 − 1; i >= 0; i −− ){<br>    sublayer_level_present_flag[ i ]<br>    if( sublayer_level_present_flag[ i ] )<br>      sublayer_level_idc[ i ]<br>  }<br>  while( !byte_aligned( ) )<br>    ptl_alignment_zero_bit<br>} | <br><br>u(7)<br>u(1)<br><br><br>u(8)<br><br>u(8)<br><br>u(32)<br><br><br>u(1)<br><br>u(8)<br><br><br>f(1) |

As table 9 indicates, the two "For" loops shown in Table 5 are replaced by a single "For" loop.

Figure 8:
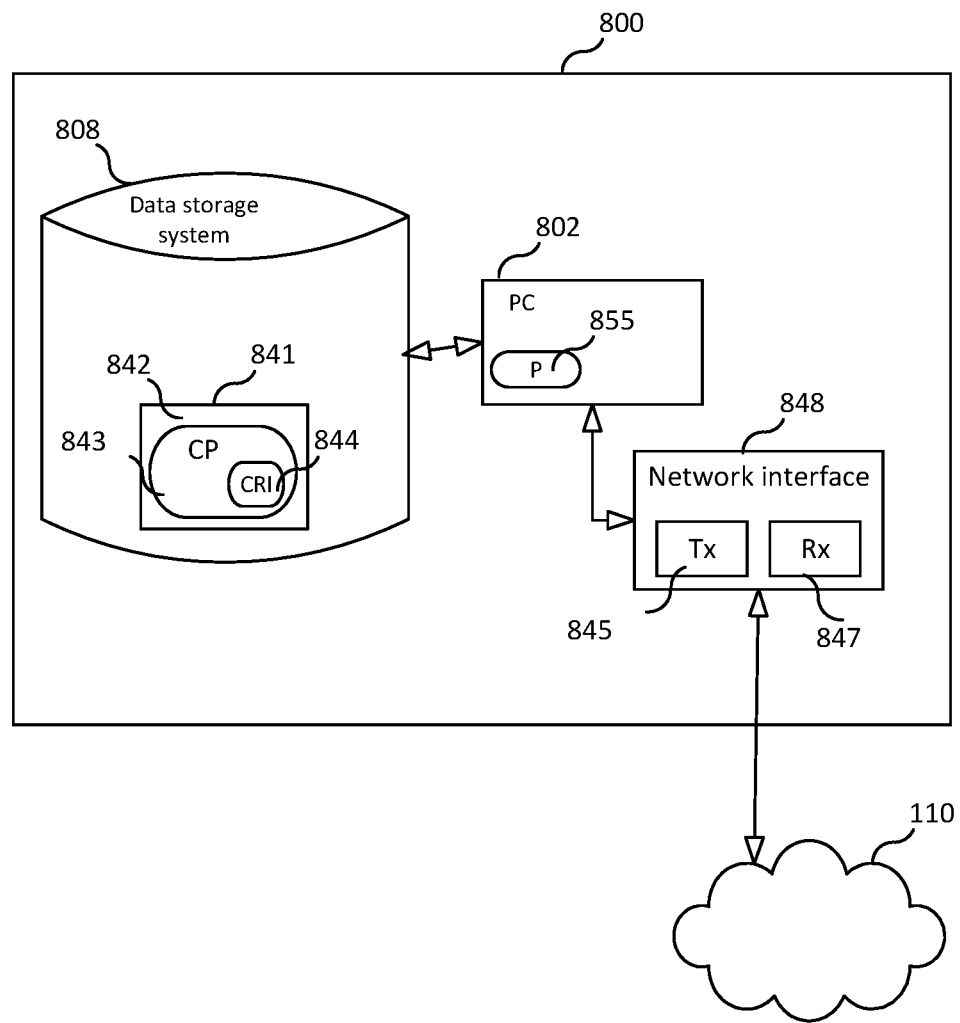
FIG. 8 is a block diagram of an apparatus according to an embodiment.

FIG. 8 is a block diagram of an apparatus 800 for implementing decoder 104 and/or encoder 102, according to some embodiments. When apparatus 800 implements a decoder, apparatus 800 may be referred to as a "decoding apparatus 800," and when apparatus 800 implements an encoder, apparatus 800 may be referred to as an "encoding apparatus 800." As shown in FIG. 8, apparatus 800 may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 800 may be a distributed computing apparatus); at least one network interface 848 comprising a transmitter (Tx) 845 and a receiver (Rx) 847 for enabling apparatus 800 to transmit data to and receive data from other nodes connected to a network 110 (e.g., an Internet Protocol (IP) network) to which network interface 848 is connected (directly or indirectly) (e.g., network interface 848 may be wirelessly connected to the network 110, in which case network interface 848 is connected to an antenna arrangement); and a storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes apparatus 800 to perform steps described herein (e.g., steps described herein with reference to the flow charts). In other embodiments, apparatus 800 may be configured to perform steps described herein without the need for code. That is, for example, PC 802 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for processing a bitstream, the method comprising:
    determining a value, N, wherein N indicates a number of ordered sublayer representations, wherein the number of ordered sublayer representations is greater than or equal to 3 such that the ordered sublayer representations comprise a first sublayer representation, a second sublayer representation, and a third sublayer representation, wherein the first sublayer representation has a first temporal sublayer identifier value (TemporalId1), where TemporalId1=0, the second sublayer representation has a second temporal sublayer identifier value (TemporalId2), where TemporalId2=1, and the third sublayer representation has a third temporal sublayer identifier value (TemporalId3), where TemporalId3=2;
    determining whether the bitstream contains a second syntax element associated with the second sublayer representation;
    if the bitstream contains the second syntax element, then deriving a second sublayer level value for the second sublayer representation based on a value decoded from the second syntax element, otherwise deriving the second sublayer level value based on a third sublayer level value derived for the third sublayer representation;
    after determining whether the bitstream contains the second syntax element, determining whether the bitstream contains a first syntax element associated with the first sublayer representation; and
    if the bitstream contains the first syntax element, then deriving a first sublayer level value for the first sublayer representation based on a value decoded from the first syntax element, otherwise deriving the first sublayer level value based on the second sublayer level value.

2. The method of claim 1, wherein
    the bitstream contains both the second syntax element and the first syntax element, and
    the second syntax element precedes said first syntax element in the bitstream.

3. The method of claim 1, wherein
    the method further comprises decoding a second flag syntax element from the bitstream to produce a second decoded flag value, and
    determining whether the bitstream contains the second syntax element comprises determining whether the second decoded flag value is equal to a predetermined value.

4. The method of claim 3, wherein
    the method further comprises decoding a first flag syntax element from the bitstream to produce a first decoded flag value, and
    determining whether the bitstream contains the first syntax element comprises determining whether the first decoded flag value is equal to the predetermined value.

5. The method of claim 1, wherein determining N comprises determining N based on a syntax element included in the bitstream.

6. The method of claim 1, wherein determining N comprises:
    determining N based on a syntax element included in a Video Parameter Set, VPS, included in the bitstream, or
    determining N based on a syntax element included in a Sequence Parameter Set, SPS, included in the bitstream.

7. The method of claim 5, wherein determining N is based on a syntax element that specifies a max temporal ID for a profile, tier and level (PTL) structure, or a syntax element that is used to determine the max number of sublayers.

8. The method of claim 1, wherein the third sublayer level value is derived based on a value derived from a syntax element included in a parameter set included in the bitstream.

9. The method of claim 8, wherein the parameter set is a Sequence Parameter Set or a Video Parameter Set.

10. The method of claim 1, further comprising:
    setting a first variable associated with the first sublayer representation equal to the first sublayer level value;
    setting a second variable associated with the second sublayer representation equal to the second sublayer level value; and
    setting a third variable associated with the third sublayer representation equal to the third sublayer level value.

11. A non-transitory computer readable storage medium storing a computer program comprising instructions which when executed by processing circuitry of an apparatus causes the apparatus to perform the method of claim 1.

12. An apparatus, the apparatus comprising:
processing circuitry; and
a memory, said memory containing instructions executable by said processing circuitry for configuring the apparatus to
determine a value, N, wherein N indicates a number of ordered sublayer representations, wherein the number of ordered sublayer representations is greater than or equal to 3 such that the ordered sublayer representations comprise a first sublayer representation, a second sublayer representation, and a third sublayer representation, wherein the first sublayer representation has a first temporal sublayer identifier value (TemporalId1), where TemporalId1=0, the second sublayer representation has a second temporal sublayer identifier value (TemporalId2), where TemporalId2=1, and the third sublayer representation has a third temporal sublayer identifier value (TemporalId3), where TemporalId3=2;
determine whether the bitstream contains a second syntax element associated with the second sublayer representation;
derive a second sublayer level value for the second sublayer representation based on a value decoded from the second syntax element if the bitstream contains the second syntax element, otherwise the apparatus is configured to derive the second sublayer level value based on a third sublayer level value derived for the third sublayer representation;
after determining whether the bitstream contains the second syntax element, determine whether the bitstream contains a first syntax element associated with the first sublayer representation; and
derive a first sublayer level value for the first sublayer representation based on a value decoded from the first syntax element if the bitstream contains the first syntax element, otherwise the apparatus is configured to derive the first sublayer level value based on the second sublayer level value.

13. The apparatus of claim 12, wherein the apparatus is further configured to:
set a third variable associated with the third sublayer representation equal to the third sublayer level value,
after setting the third variable equal to the third sublayer level value, set a second variable associated with the second sublayer representation equal to the second sublayer level value; and
after setting the second variable equal to the second sublayer level value, set a first variable associated with the first sublayer representation equal to the first sublayer level value.

14. The apparatus of claim 12, wherein
the apparatus is further configured to decode a first flag syntax element from the bitstream to produce a first decoded flag value, and
the apparatus is configured to determine whether the bitstream contains the first syntax element by determining whether the first decoded flag value is equal to a predetermined value.

15. The apparatus of claim 14, wherein
the apparatus is further configured to decode a second flag syntax element from the bitstream to produce a second decoded flag value, and
the apparatus is configured to determine whether the bitstream contains the second syntax element by determining whether the second decoded flag value is equal to the predetermined value.

16. The apparatus of claim 12, wherein the apparatus is configured to determine N based on:
a syntax element that specifies a max temporal ID for a profile, tier and level (PTL) structure,
a syntax element that is used to determine the max number of sublayers,
a syntax element included in a Video Parameter Set, VPS, included in the bitstream, or
a syntax element included in a Sequence Parameter Set, SPS, included in the bitstream.

* * * * *